United States Patent [19]

Perten et al.

[11] Patent Number: 4,706,131
[45] Date of Patent: Nov. 10, 1987

[54] PHOTOGRAPHIC COPIER IMAGE CONTRAST CONTROL

[75] Inventors: Herbert Perten, Pomona, N.Y.; William Ambrose, Irvington, N.J.

[73] Assignee: Johnson & Johnson Ultrasound, Inc., Ramsey, N.J.

[21] Appl. No.: 837,994

[22] Filed: Mar. 10, 1986

[30] Foreign Application Priority Data

Mar. 25, 1985 [GB] United Kingdom ................ 8507652

[51] Int. Cl.$^4$ ........................ H04N 1/21; H04N 5/16; G01D 9/42; G01D 15/16
[52] U.S. Cl. ................................ 358/302; 346/110 R; 346/139 R; 358/298; 358/296; 358/280; 358/171
[58] Field of Search ............... 358/296, 302, 280, 283, 358/10, 139, 298, 171, 174, 80; 340/793; 346/158, 161, 110

[56] References Cited

U.S. PATENT DOCUMENTS

| | | | |
|---|---|---|---|
| 4,314,272 | 2/1982 | Miyaji et al. | 358/10 |
| 4,335,390 | 6/1982 | Axford | 358/296 |
| 4,542,281 | 9/1985 | Thompson | 219/216 |
| 4,568,975 | 2/1986 | Harschbarger | 358/139 |
| 4,631,589 | 12/1986 | Hongu et al. | 358/171 |

Primary Examiner—E. A. Goldberg
Assistant Examiner—Linda M. Peco
Attorney, Agent, or Firm—W. Brinton Yorks, Jr.

[57] ABSTRACT

A thermally developed photographic copier is provided having two controls, one for adjusting the contrast, or blackness, of an image, and another for adjusting background contrast. A microprocessor samples and processes the settings of these controls to produce a video pedestal determined by the background contrast control, and a gain control signal adjusted for effects of the background contrast setting to keep amplified video singals within the dynamic range necessary for the image contrast setting. Video signals used to expose light-sensitive paper or film are amplified in accordance with the gain control signal and combined with the video pedestal for desired background contrast. The system can automatically modify the gain and video pedestal levels for different lots of paper or film by recording a calibrated grey scale, scanning the recorded grey scale image, comparing the scanned image with previously stored information on the desired image, and modifying the gain and pedestal values as necessary to reproduce images of the desired appearance.

10 Claims, 13 Drawing Figures

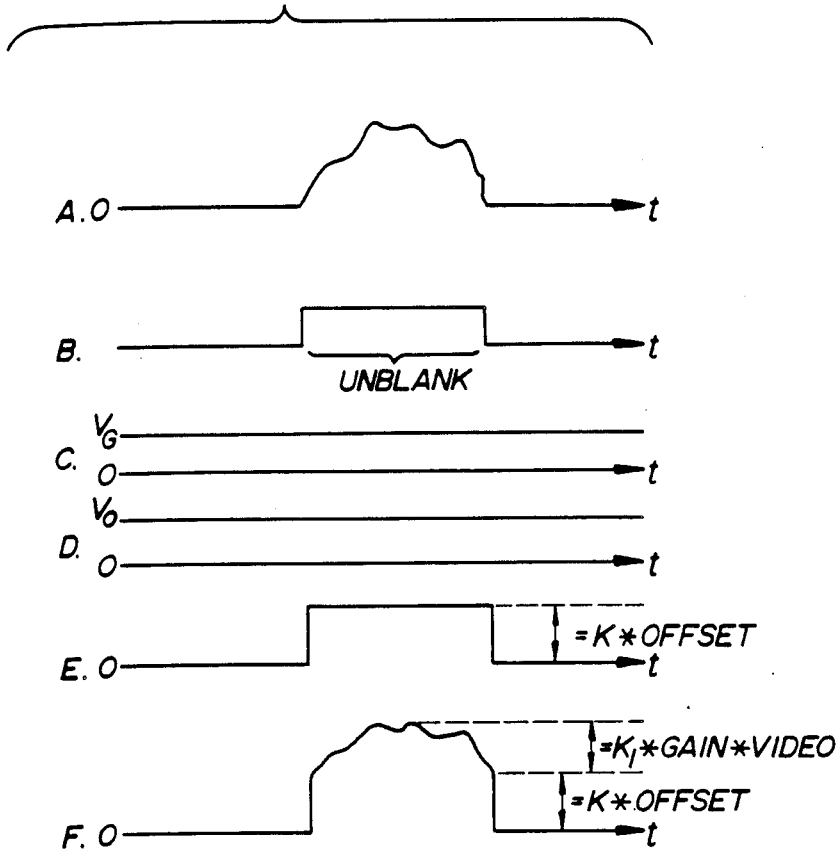

PHOTOGRAPHIC COPIER IMAGE CONTRAST CONTROL

This invention relates to hard copy recorders or copiers, in which light-sensitive paper or film is exposed to an image transfer medium and then thermally developed. In particular, this invention relates to techniques for controlling the contrast of such an image.

In a thermally developed photographic copier, light-sensitive paper or film is exposed to an image, as by exposing the paper or film to a cathode ray tube (CRT) image. In a typical arrangement in which the paper or film is continually moving as it is exposed, the CRT may be one which produces only a single scanned line. As the paper or film moves past the face of the tube, a complete image may be produced a line at a time, by scanning lines of the image across the paper. In such an image transfer technique, the image that is reproduced on the developed paper or film is a negative one. That is, a bright dot on the cathode ray tube screen will expose the paper or film which, after developing, will appear as a dark dot on the paper or film. Unexposed paper or film will develop as white sheets, and fully exposed paper or film will appear black. Thus, a reproduced image may be comprised of a number of different grey tones, depending upon the varying brightness content of the cathode ray tube image.

Different users may desire images of different appearances and grey tones. Adjustment of image appearance is conventionally done in the same manner as a television receiver adjustment. The cathode ray tube may have standard brightness and contrast controls which the user may adjust to produce the desired hard copy image. However, the effects of these controls are to a certain extent interactive. While the contrast control will generally modify the range of black to white areas without disturbing the absolute value of white image areas, adjustment of the brightness control will modify the full range of contrast, varying both white and black areas proportionately. Since the user cannot view the effects of these adjustments as they are being performed, but must record images and make adjustments in an iterative fashion, a great deal of time and paper can be wasted before the user arrives at the desired result.

In accordance with the principles of the present invention, separate controls are provided for adjusting the image contrast and the background contrast of the developed images in a hard copy recorder. To prevent interaction of the controls, their settings are sampled by a microprocessor which processes the control signals to produce a gain and a reference signal for the video image signal. The control signals are processed so that variation of the reference signal will not alter the effects produced by the gain signal, or vice-versa, thereby isolating the effects of the two controls. The user may therefore adjust the recorder for the desired image appearance in only one or two recording iterations.

Once the user has adjusted the recorder to produce images of the desired appearance, it is generally desirable for the selected image appearance to be maintained. This is not always possible, however, particularly when the paper supply is changed. Paper from different lots, of different ages, and other characteristics can produce distinctly different images from the same control settings. It would be desirable for the recorder to automatically adjust its control settings When the paper is changed so that images of substantially the same appearance will be produced, regardless of variations in the paper characteristics.

In accordance with a further aspect of the present invention, an automatic contrast control feature is provided to assure uniformity of the appearance of the hard copy images. Once the recorder has been adjusted to produce the desired images, an image such as one made by a calibrated signal is produced. This image is optically scanned to provide reference signals which are stored by the recorder. When the paper is changed or it is otherwise desirable to recalibrate the machine, the reference image is once again produced and optically scanned. The recorder compares the newly scanned information with the previously stored reference signals, then varies the processing parameters of the video signal under, for instance, microprocessor control, to adjust the machine for the production of images of substantially the same appearance as the calibrated image. The microprocessor stores calibration values for a number of users, which can be recalled when a user resumes use of the recorder.

In the drawings:

FIG. 3 illustrates signal conditions at various points in the arrangement of FIG. 1;

In applications involving use of photographic copiers, an image must first be generated external to the copier. Typically, an image is developed optically or electronically by various means, then stored in a memory. One application of the photographic copier of the present invention is the hard copy recording of ultrasonically acquired images. The ultrasonic image is stored in memory, such as the memory of an ultrasonic scan converter. The image information is then read out of the memory, line by line, and used to modulate a video signal. The video signal is synchronized with the deflection signals of the copier's CRT, and also with the paper speed. As the video signal containing the image line information is applied to the CRT, it is processed in accordance with the principles of the present invention for the development of desired image contrast.

Figure 1:
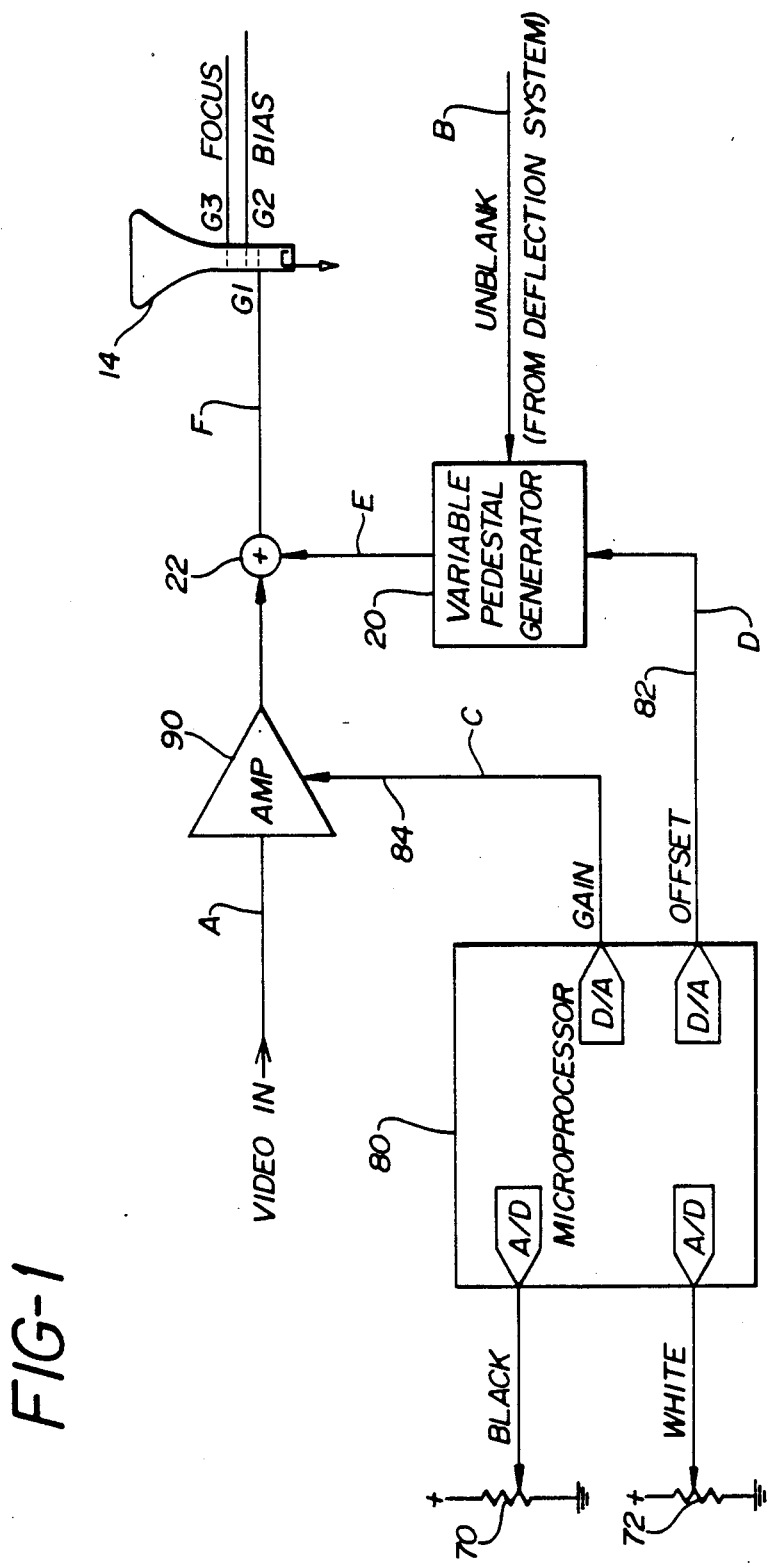
FIG. 1 illustrates, in block diagram form, an image contrast control arrangement for a photographic copier constructed in accordance with the principles of the present invention.

Referring to FIG. 1, an arrangement for controlling the appearance of the hard copy image is shown in schematic diagram form. The arrangement includes two user-operated controls, a "black" potentiometer 70 and a "white" potentiometer 72. The black potentiometer is a contrast control for adjusting the contrast of the image. In the case of an ultrasonic image, the image will represent tissue structure in the body. Adjusting the black potentiometer will determine how dark the tissue structure of highest contrast will appear in the reproduced image, while leaving white image areas relatively unchanged.

The ultrasonic image of tissue structure is cast against a background which is controlled by the white potentiometer 72. Varying the white control will determine whether the image appears on a white background, or one of varying shades of grey. In FIG. 1, the wipers of the black potentiometer 70 and the white potentiometer 72 are coupled to respective analog-to-digital converters of a microprocessor 80. The settings of the potentiometers are sampled and procesed to produce offset and gain control voltages for the video signal containing the image information. A video amplifier 90 amplifies the video input signal, which is then used to expose the paper or film on the face of a cathode ray tube 14.

It is desirable for the black and white controls independently modify their respective image and background areas without interaction. This does not happen when the controls are used to control a conventional video amplifier such as amplifier 90. The amplifier 90 is characterized by the expression $$V_{out} = AV_{in} + \text{Offset}$$

where A is a gain factor, $V_{in}$ is the input video signal, and "offset" is an offset relative to a given signal level. The output signal $V_{out}$ is seen to be functionally related to both gain and offset. Specifically, the offset level establishes a baseline from which the range of gain control is referenced. That is, increasing the offset signal will increase $V_{out}$ by an incremental amount for all $V_{in}$ input signals, thereby degrading the whiteness and increasing the blackness of the image. It is desirable for this interaction to be prevented, so that a change in the background (white) control setting will not change the relative blackness of the image.

This is accomplished by processing the black and white control signals in the microprocessor 80 to develop separate gain and offset control signals which separately represent the effects on image and background contrast. The gain control signal is coupled between an output digital-to-analog converter and the gain control input of amplifier 90 by line 84. The offset control signal is coupled between another output digital-to-analog converter and a variable pedestal generator 20 by line 82. The pedestal generator 20 also receives a timing signal called UNBLANK from the deflection system of the CRT 14. The UNBLANK signal indicates the times between the horizontal retrace interval that the CRT beam is unblanked and scans a line on the face of the CRT. The outputs of the pedestal generator 20 and the amplifier 90 are combined at a summing junction 22. The summing junction 22 is coupled to the G1 control grid of the CRT 14. Bias and focus control voltages are applied to the G2 and G3 grids of the tube.

Figure 2:
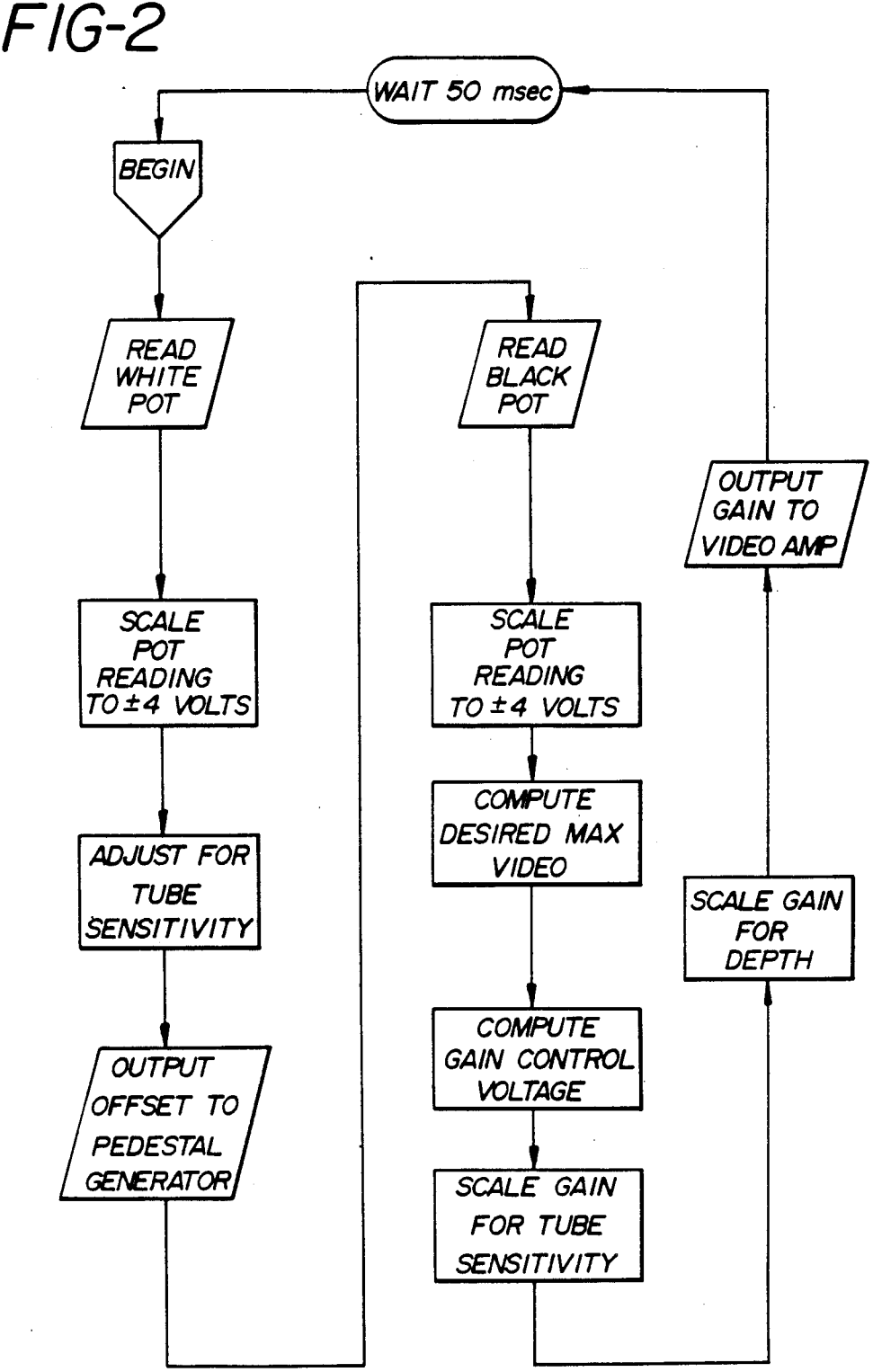
FIG. 2 is a flowchart of a constrast control program for the microprocessor of FIG. 1.

Referring concurrently to FIGS. 1 and 2, a flowchart for a suitable black and white control program for microprocessor 80 is shown. The program begins by reading the setting of the white control potentiometer 72, which is converted to a digital value by an analog to digital converter. Next, the pot reading is scaled over a predetermined range of values. In a constructed embodiment of the present invention, the white pot produces a voltage over the range of zero to 5 volts, with 2.5 volts being the centered value. This range is scaled by the program to a 0 to −8 range. The desired offset is computed as:

Desired offset = Minimum offset + white pot value

The program then applies a tube sensitivity factor to the scaled white pot value. The tube sensitivity factor is expressed as (Tsen/30), where Tsen is the sensitivity of the tube of a particular recorder. The minimum tube sensitivity in the constructed embodiment can be 30 volts, which results in a sensitivity factor of one. For tubes of greater sensitivity the sensitivity factor is less than one. The offset control value is therefore calculated as Offset = (Tsen/30) (Scaled White Pot Value + Minimum offset)

The offset voltage is then scaled for ultrasound depth for the gain control voltage.

This offset control value is stored in a memory register from which it is converted to an analog voltage and applied to pedestal generator 20 by way of control line 82. The program then goes to the black potentiometer sequence.

In the black control sequence, the setting of the black control potentiometer 70 is read by converting the pot setting to a digital value. The gain, or image contrast calculation starts by scaling the black pot value to the 0 to −8 volt range. Then, the desired maximum video level is computed in accordance with the expression Desired Peak Video = (Minimum video + Desired Offset + Scaled Black Value)

where Minimum video is the minimum video level.

In the above expression for Max Video, the white value is the scaled white pot value with its sign reversed from that used in the offset calculation. The Black Value term uses the sign obtained in the scaling of the black pot reading. This is because the effect of the white setting on Max Video is opposite to that of the black pot, which offsets the effect of a white adjustment on the image contrast-controlling black level setting. Thus, if the scaled white pot reading was +2, a −2 value is used in the Max Video calculation. The sense of the scaled black pot reading is unchanged.

Once Max Video has been calculated the sensitivity adjusted gain control voltage value may be computed in accordance with the expression Gain Control V = (Max Video)/(Ampl. Gain) (Tsen/30)

The tube sensitivity scaling factor is the same as discussed above. The Ampl. Gain term is a factor expressing the gain of video amplifier 90. In a constructed embodiment of the present invention the amplifier gain is expressed as 5.33×Control voltage. That is, for a control voltage of 3.75 volts, a 1.5 volt video input signal to the amplifier will result in a 30 volt output signal. The Amplifier gain is normalized for a 1.5 volt signal to be: 1.5×5.33=8.

The Gain control Voltage thus calculated is then scaled for depth when the copier is used to reproduce ultrasonic images. The ultrasonic image shows tissue structure at increasing depths relative to the skin line, with the maximum depth being selected by the user. But regardless of the selected depth, the displayed image is always the same size (165 mm). The image is scanned in the direction of increasing depth; that is, a single scan line will begin at the skin line. When only a shallow depth such as 4 cm is represented in the image, the scanning beam scans across the paper rapidly; a 4 cm depth is scanned across the paper in 52 microseconds. Conversely, at a greater depth the beam scans across the paper more slowly; at a 24 cm depth, the paper is scanned in 312 microseconds. The result is greater paper exposure at greater depths, and relatively less exposure at lesser depths. To account for this difference in exposure, the scanning beam intensity must be adjusted as a function of depth, or scanning beam speed. Accordingly, the Gain Control Voltage is scaled by applying a lesser gain factor for increasing depths (when the scanning beam moves more slowly), and a greater gain factor is applied for lesser depths (when the beam scans faster). The scaled Gain Control Voltage is then stored and converted to an analog control voltage, and applied to amplifier 90 by way of line 84. The Gain Control Voltage is effectively the control voltage needed to obtain the desired maximum video signal level for the desired contrast.

The signals at various points in the configuration of FIG. 1 are illustrated by the respective lettered waveforms in FIG. 3. A video signal for one image line is represented in FIG. 3A. FIG. 3B represents the timing of the active line scan interval as indicated by the UNBLANK signal. The gain control signal on line 84 is represented by a static level $V_G$ in FIG. 3C, and the offset control signal on line 82 is represented by level $V_o$ in FIG. 3D. The $V_o$ control signal indicates the amplitude of a pedestal to be developed by the pedestal generator 20 during the time of the UNBLANK signal, and the pedestal signal produced by the generator, equal to a constant K times the offset control signal, is shown in FIG. 3E. The amplified video signal produced by amplifier 90 is equal to the input video signal times a constant K, times the gain control signal. The composite of the pedestal and the amplified video signal at the G1 grid is represented in FIG. 3F.

Figure 4A:
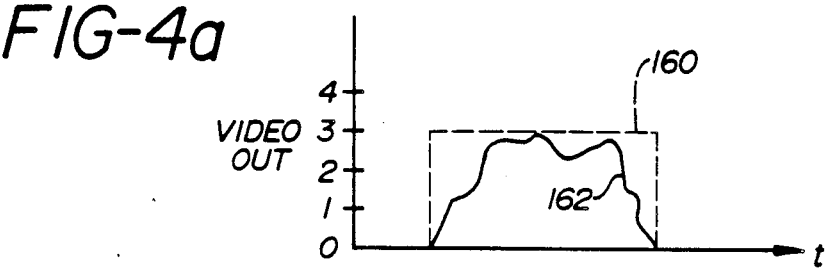
FIGS. 4a, 4b and 4c illustrate various operating conditions of the arrangement of FIG. 1.
Figure 4B:
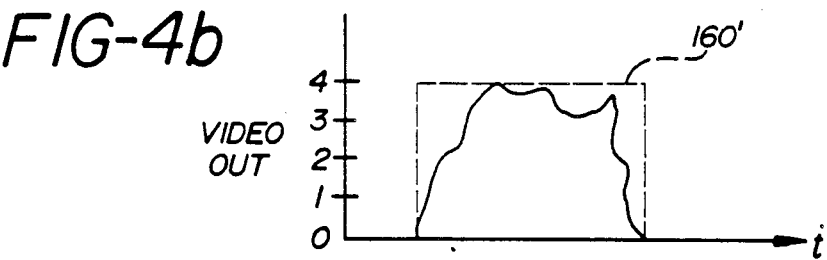
Figure 4C:
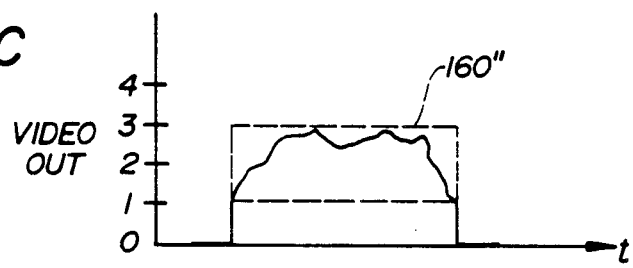

The effective operation of the black and white controls is illustrated graphically in FIGS. 4a–4c. FIG. 4a shows an arbitrary video signal waveform 162, which extends over a dynamic range of zero to three as outlined by dashed box 160. When the black contrast control is adjusted to make black areas of an image darker, the video signal gain is increased so that the dynamic range is extended, as shown by dashed box 160' in FIG. 4b. In this FIGURE, the dynamic range extends from zero to four, and the corresponding image white level remains at zero. FIG. 4c represents system operation starting from the condition of FIG. 4a when only the white control is adjusted to make background image areas darker. Since this adjustment causes an offset in the baseline of the dynamic range, it must be performed without a corresponding effect on the black level at the top of the dynamic range. Dashed box 160'' of FIG. 4c shows that the present invention allows the white level to increase from zero to one on the video output level scale without moving the upper level of the range, which remains at a video output level of three.

Figure 5:
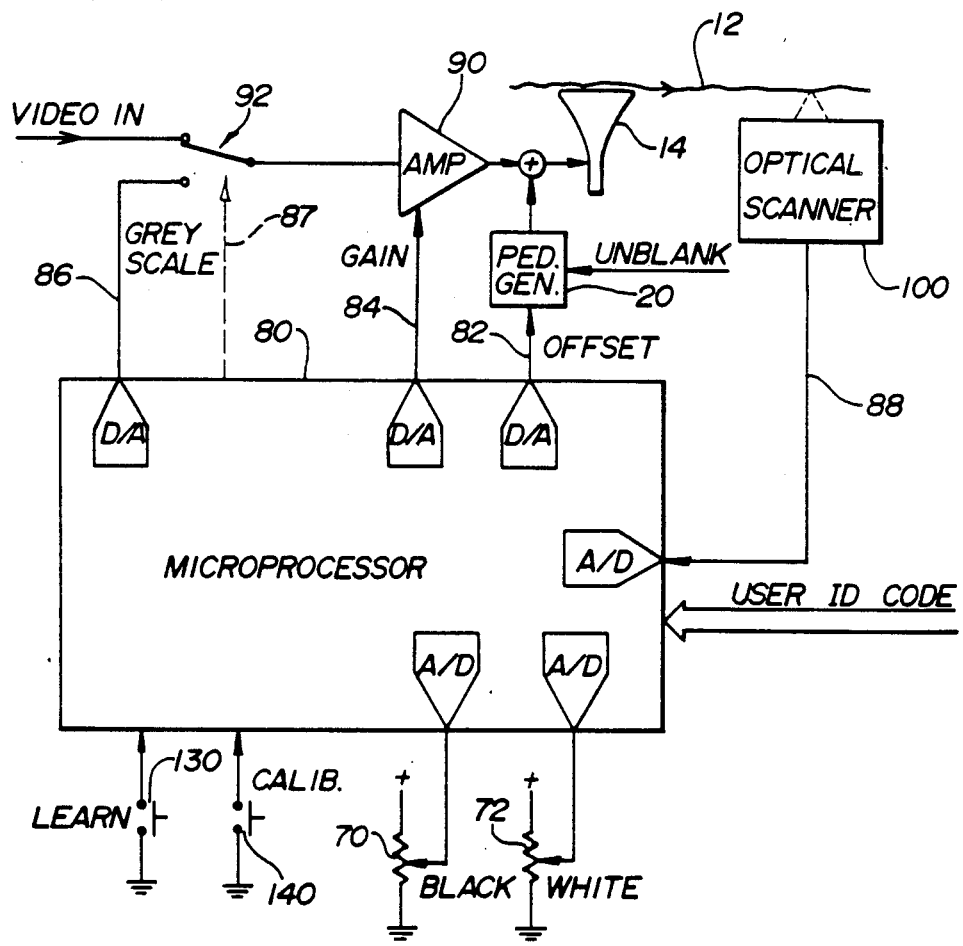
FIG. 5 is a further illustration of the control arrangement of FIG. 1 including means for automatic image contrast control.

As discussed above, different paper can exhibit different sensitivity to exposure and development. It is desirable for a recorder to produce images of substantially constant appearance, even when the paper is changed. To accomplish this automatically, the automatic contrast control arrangement of FIG. 5 is employed in the recorder of the present invention. In FIG. 5, the microprocessor 80 receives input signals from a "learn" pushbutton 130 and a "calibrate" pushbutton 140. Under control of the microprocessor, a calibrated grey scale signal is produced by a digital-to-analog converter on line 86. The grey scale is alternately selectable for reproduction along with the video input signal by a switch 92. The switch 92 is switched under microprocessor control by a signal on a control line 87. The video amplifier 90 amplifies the applied signal to produce a video signal on the face of the cathode ray tube 14. The paper 12 is exposed, developed, and the resultant image may then be scanned by an optical scanner 100. The image information is coupled from the scanner 100 to an analog-to-digital converter of the microprocessor by a line 88. The black and white controls operate as described above.

The processing step, which occurs between the exposure of the paper or film by cathode ray tube 14 and the optical scanner 100, is more fully described in concurrently filed United States patent application Ser. No. 838,076, entitled "HARD COPY RECORDER PAPER SPEED CONTROL."

Figure 6:
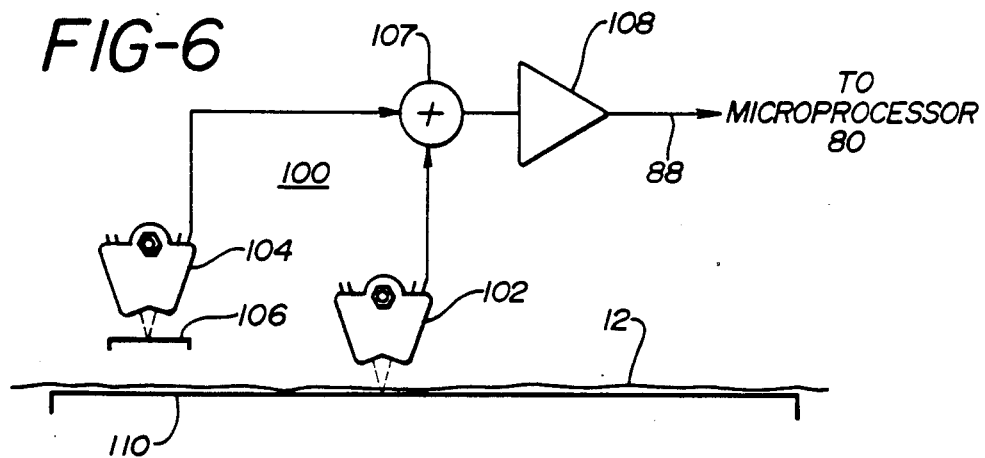
FIG. 6 illustrates an optical sensor arrangement useful in the automatic contrast control arrangement of FIG. 5.

The optical scanner 100 may be a hand-held light pen type scanner such as those used with supermarket checkout machines, or may be a built-in arrangement as shown in FIG. 6. The paper 12 moves along a surface 110, which may provide a white background when film is used in place of the paper. The moving paper is viewed by a reflective type optical sensor 102, which contains a light source and a phototransistor. Such sensors are available from Vactec Optoelectronics as model VTR17. The phototransistor output signal is coupled to a summation input point 107 of a differential amplifier 108. A second optical sensor 104 is used to illuminate and view a reflective reference surface 106. The phototransistor output from optical sensor 104 is also coupled to the summation point 107 of the differential amplifier 108. The signals from the optical sensors will thermally track each other, thereby eliminating thermal effects in the differential amplifier output signal, which will represent only the sensed reflectance changes. The difference signal produced by the differential amplifier is coupled by way of line 88 to the microprocessor 80.

Figure 7:
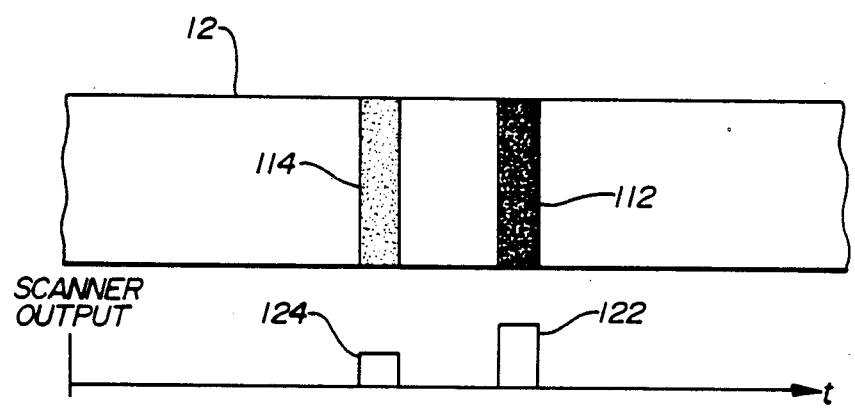
FIG. 7 illustrates a test strip used by the automatic contrast control arrangement of FIG. 5.

Operation of the automatic contrast control arrangement of FIG. 5 is as follows. When the recorder is adjusted to produce desirable images through adjustment of the black and white controls, the learn button 130 is depressed. The microprocessor 80 will switch the switch 92 to the grey scale position, and a grey scale will be produced on the paper. The grey scale may exhibit many shades varying from white to black, or as few as two shades, one relatively white and one relatively dark, as shown by bars 114 and 112 in FIG. 7. The developed paper is scanned by the optical scanner which, for the two stripe example of FIG. 7, will produce output levels 122 and 124 corresponding to the grey scale bars. These output level signals are stored by the microprocessor.

Thereafter, when the paper is changed or it is otherwise desirable to calibrate the recorder, the calibrate button 140 is depressed. Again, a grey scale is produced and scanned as before, and the output levels from the optical scanner are stored. The new output levels are compared with the previously stored levels, and the differences are processed to produce newly calibrated gain and offset signals on lines 84 and 82, if necessary.

Thereafter, images on the paper will be substantially similar to the original images produced during setup of the recorder.

Figure 8A:
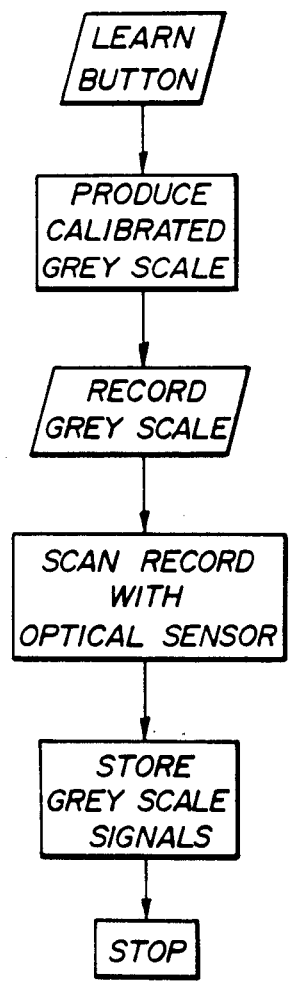
FIGS. 8a–8c are a flowchart of the automatic contrast control program of the microprocessor of FIG. 6.
Figure 8B:
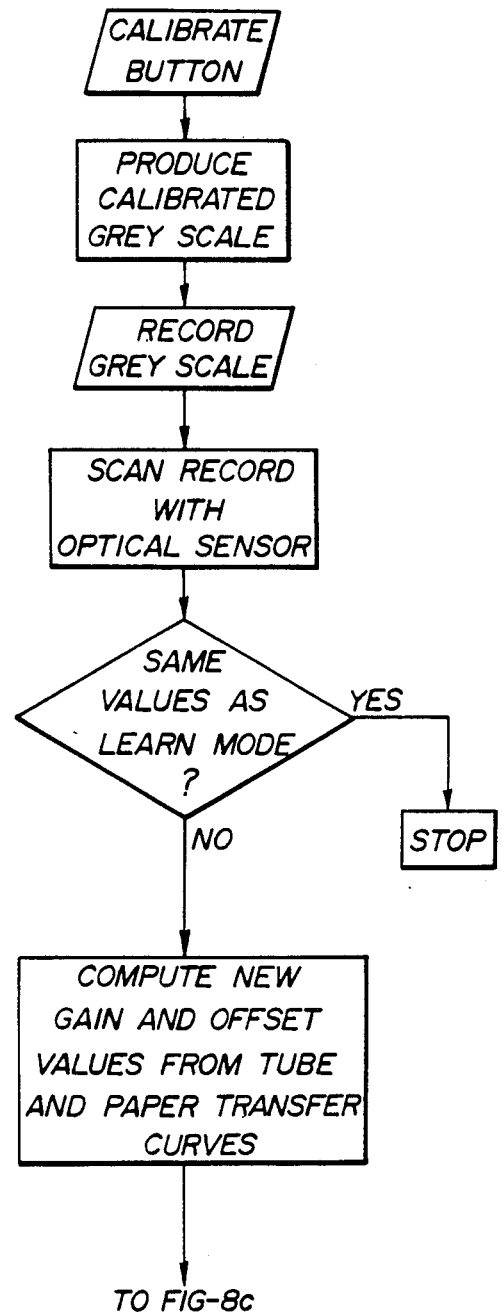
Figure 8C:
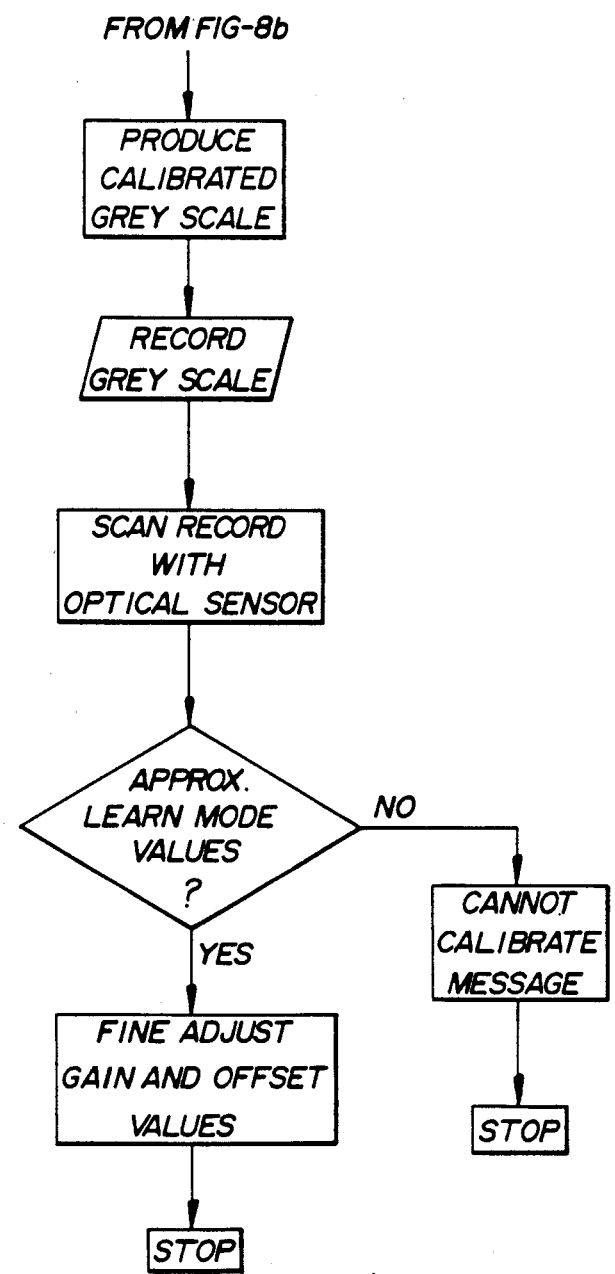

The processing of the grey scale signals takes into consideration the nonlinear characteristics of the paper developing process and the cathode ray tube. Referring to FIGS. 8a to 8c, flowcharts for an automatic constant control program for the microprocessor 80 are shown. The sequence of FIG. 8a is initiated when the learn button 130 is depressed. The microprocessor produces a control signal on line 87 to switch the switch 92 to the grey scale position. A calibrated grey scale signal of two or more shaded bars is then produced on line 86 and a calibrated grey scale record is made on the paper or film 12. The optical scanner 100 scans the grey scale record, producing signals such as those shown in FIG. 7. These signals are stored for future reference in the microprocessor memory.

At some later time when it is desired to recalibrate the recorder or new paper is put into the unit, the calibrate button 140 is depressed as indicated in FIG. 8b. A calibrated grey scale signal is again produced on line 86 and coupled by way of switch 92 and amplifier 90 to the tube 14. The grey scale bars are recorded and the record is scanned by the optical scanner 100, again producing signals indicative of the shades of the grey scale bars. These signal levels are compared with the previously stored learn mode signals in the microprocessor. If the levels are substantially the same, the calibrate program is terminated.

Figure 9:
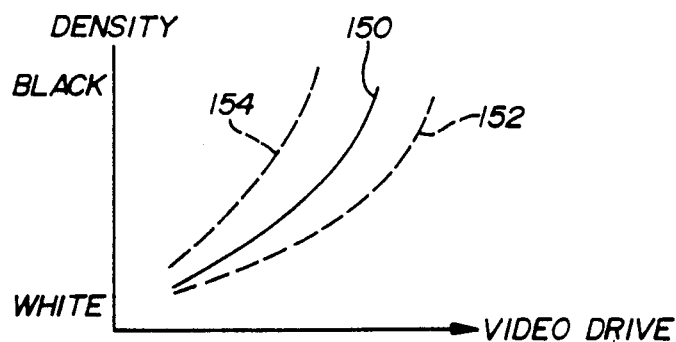
FIG. 9 is a graphical representation of various contrast control characteristics.

If the new levels are not substantially the same as the stored signals, new values must be calculated for the gain and offset signals for the amplifier 90 and the pedestal generator 20. Several tables are resident in the microprocessor memory, representing the transfer function curves of the tube intensity and the thermal paper characteristics. These curves are generally somewhat nonlinear and, because the scanner records the product of both transfer functions when it scans the record on the paper, each table represents the product of both the tube and a paper transfer function curve. By comparing the learn mode grey scale signals and the calibrate mode grey scale signals to values in these tables, an approximate fit of the two sets of signals to the transfer function tables can be made. The microprocessor can then determine what adjustment to the gain and offset signals is necessary to match the recorder to the original learn mode characteristic. By way of illustration, suppose that the learn mode signals fit the transfer function curve 150 in FIG. 9. A different lot of paper in combination with the tube characteristics may produce a grey scale exhibiting a transfer function which fits a new curve, such as dashed curves 152 or 154 in FIG. 9. Comparison of the desired curve 150 with the new curve will yield the necessary gain and offset corrections to again produce the originally desired image characteristics.

Continuing on to FIG. 8c the microprocessor again produces a calibrated grey scale signal and a grey scale record is produced, this time using the new gain and offset signals applied to the amplifier 90 and the pedestal generator 20. The grey scale record is scanned by the optical scanner 100 and new grey scale level signals are produced. These signals are once again compared with the stored learn mode signals. If the transfer function curve of the new signals is within a range tolerance of the desired characteristic, a last fine adjustment is made to the gain and offset values and the program terminates, having made a successful calibration. If the transfer function curve of the new grey scale signal is not within a range tolerance of the desired characteristic, due to an unusual lot of paper or any other reason, a message or other signal is produced by the recorder to inform the user that it cannot calibrate the recorder to the desired characteristic. The program then terminates, leaving the user to take any appropriate action or make necessary modifications to the system.

While it is to be expected that different users will prefer different image appearances, it is also to be expected that the same user will desire the same image appearance each time he uses the copier. For this reason, the microprocessor 80 may be responsive to a user identification code provided through the keyboard of the ultrasound machine or other host system. The user identification code and the learn mode image characteristics for the user are stored together in the microprocessor memory. When the user again operates the system, he will enter his identification code into the microprocessor, which will select the image characteristics previously stored by that user. The user need only press the calibrate button 140 to recalibrate the copier to produce the characteristic images he desires, without the need to repeat the learn made process. A suitable number of user identification codes and their associated image characteristics may be stored in an appropriately sized microprocessor memory.

What is claimed is:

1. In a hard copy recorder, in which light-sensitive paper or film is exposed to an image produced by a cathode ray tube, apparatus for controlling image contrast comprising:
   a source of video signals;
   first and second controls for separately adjusting image intensity and background shading;
   means, coupled to said first and second controls, for developing a first control signal representative of background shading, and for developing a second control signal representative of image intensity and determining a maximum intensity level established solely by said image intensity control setting;
   means for amplifying video signals produced by said source by a factor determined by said second control setting;
   means for producing a video pedestal signal exhibiting a level determined by said first control signal;
   means for combining said amplified video signals and said video pedestal signal; and
   means for applying said combined signals to said cathode ray tube.

2. In a hard copy recorder, in which light-sensitive paper or film is exposed to an image produced by a cathode ray tube, apparatus for controlling image contrast comprising:
   a source of video signals;
   first and second controls for separately adjusting image intensity and background shading;
   processing means, coupled to said first and second controls, for producing a pedestal level signal functionally related to the setting of said second control independent of the setting of said first control, and for producing a gain control signal which establishes a maximum intensity level offset for effects of background shading;
   means for producing a video pedestal signal in response to said pedestal level signal;

means for amplifying video signals produced by said source by a factor which is a function of said gain control signal;

means for combining said amplified video signals and said video pedestal signal; and means for applying said combined signals to said cathode ray tube.

3. In a hard copy recorder, in which light-sensitive paper or film is exposed to an image produced by a cathode ray tube, apparatus for controlling image contrast comprising:

a source of video signals;

a first control for producing a background shading control signal;

a second control for producing a dynamic range control signal;

processing means, coupled to said first and second controls, for producing a pedestal level signal which is a function of said background shading control signal, and for producing a gain control signal for amplifying video signals to be within the dynamic range established by said dynamic range control signal;

means for amplifying video signals produced by said source as a function of said gain control signal and for offsetting said amplified signals from a nominal baseline level by an amount which is a function of said pedestal level signal; and means for applying said amplified and offset signals to said cathode ray tube.

4. In the hard copy recorder of claim 3, apparatus further comprising:

means for developing said exposed light-sensitive paper or film;

means for producing an image of a predetermined intensity on said paper or film;

means for scanning paper or film on which said image of predetermined intensity has been produced to provide an output signal representative of said predetermined intensity; and means for storing said output signal.

5. In the hard copy recorder of claim 4, apparatus further comprising:

means, responsive to said scanning means and said storing means, for comparing an output signal provided by said scanning means with a stored output signal to develop a comparison signal; and means, responsive to said comparison signal, for adjusting the value of at least one of the signals produced by said processing means.

6. In the hard copy recorder of claim 4, wherein said storing means further includes means for storing an associated user identification code.

7. In the hard copy recorder of claim 5, apparatus further comprising a switch having a first input coupled to said source of video signals, a second input coupled to said means for producing an image of a predetermined intensity, and an output coupled to said amplifying means.

8. In the hard copy recorder of claim 4, wherein said scanning means comprises an optical scanner.

9. In the hard copy recorder of claim 8, wherein said image of a predetermined intensity comprises a calibrated grey scale image.

10. In the hard copy recorder of claim 9, wherein said comparing means further includes means for storing values representative of cathode ray tube intensity and paper or film characteristics, wherein said output signal and said stored output signal are compared with said stored values.

* * * * *